March 2, 1937.　　　G. L. CAMERON　　　2,072,441

CLINICAL THERMOMETER CASE

Filed Oct. 19, 1935

INVENTOR.
George L. Cameron
BY C. P. Goebel
his ATTORNEY.

Patented Mar. 2, 1937

2,072,441

UNITED STATES PATENT OFFICE 2,072,441

CLINICAL THERMOMETER CASE

George L. Cameron, Montclair, N. J.

Application October 19, 1935, Serial No. 45,749

1 Claim. (Cl. 206—16.5)

This invention relates to clinical thermometer cases and has for its object to provide a case to hold a thermometer in such a manner that the dropping of the case will not break the thermometer, which as is known, is easily broken.

For this purpose, my invention consists of a case having a thermometer enveloping sheath and air chamber abutments at each end to abut against the ends of the thermometer. The outer contour of the case may be in the form of a pencil or the like.

Embodiments of my invention will be shown and described hereinafter, and the invention will be finally pointed out in the claim.

In the accompanying drawing,—

Similar characters indicate corresponding parts.

Figure 1:
Figure 1 is a central longitudinal section of my improved case.

Referring to the drawing, and more particularly to Figure 1, the pencil or fountain pen-like exterior casing 10 is provided at its closed portion 11, in the interior thereof, with an air chamber 12, formed by a rubber cap 13, having a cylindrical portion 14 and a top portion 15. At the end of this cap is a cylindrically shaped member 16 having a bore 17 of a diameter substantially equal to that of a thermometer 9, and the length of this member is such as to include the major portion of the length of the thermometer. This member is made of rubber of the kind known as sponge rubber, and this rubber has the advantage of giving a surface contact of the exterior of the cylindrical member with the interior of the casing, and with the thermometer itself. In the embodiment, the thermometer at 9a protrudes to some extent out of the member. The member 16 can, however, be readily extended to embrace a greater length of the thermometer. The casing is provided with the usual cap 18, and within this cap is another air cushioning member 19, again formed of a cylindrical skirt 20 and a top portion 21, the top portion facing the end of the thermometer. When the cap 18 is placed on the casing, the top portions 15 and 21 of the cushioning members abut against the ends of the thermometer and the cylindrical member of soft or sponge rubber surrounds the major part of the thermometer. The thermometer is thereupon suspended bodily by its cylindrical sheath and the ends of the thermometer are held in suspension by the curved tops of the cushioning members. No part of the length of the thermometer is subjected to any leverage inducing the thermometer to be subjected to breakage upon shock.

Instead of having the end of the thermometer extend beyond the sheath member, the sheath member may enclose the entire length of the thermometer. One way of doing this is to provide the cap with a part of this sheath member, and when the cap has been removed, the thermometer will project freely from the major portion of the sheath member. When the cap is attached the two parts of the sheath member form one entire whole. This embodiment is shown in Figure 3, in which the major portion of the sheath member is indicated by 23 and the minor portion by 24.

Instead of making the sheath member of sponge rubber or the like, it may be of a continuous spiral rubber tubing. Such an embodiment is shown in Figure 2, in which the ends of the tubing 23a are cemented by the layer 25 of cement to the next convolution.

Another embodiment consists in providing instead of one continuous tubing in spiral form a plurality of rubber tubular rings 26, one placed next to the other, and one or more of the rings cemented to each other, as shown by 27.

Figure 2:
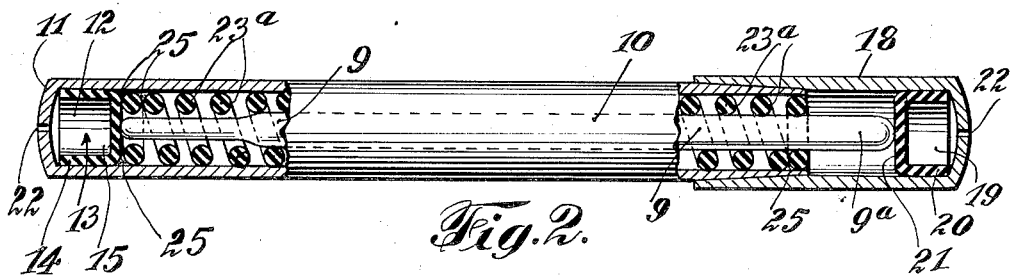
Figure 2 is a similar section of another embodiment.
Figure 3:
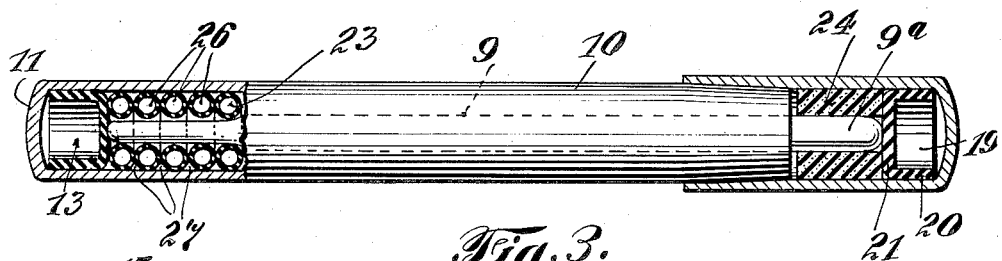
Figure 3 is a similar section of another embodiment.
Figure 4:
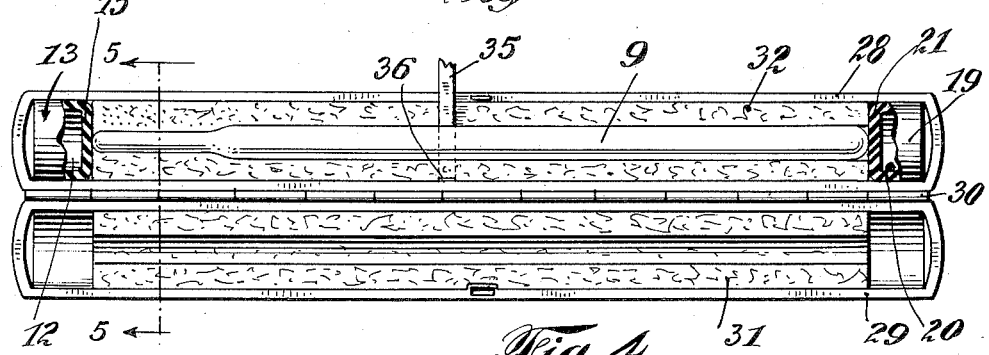
Figure 4 is a plan view in section of another embodiment when in open position.

In each of the embodiments shown, various modifications not shown in one embodiment can be embodied in the other, as for instance, in Figure 1 the thermometer has a free extension, and in Figure 3 it is covered. So, the same modification can be applied to the embodiment shown in Figures 1 and 2.

In the embodiment shown in Figures 1 and 2, the ends of the casing are provided with vent holes 22, in the nature of which valves, that is, those holes are very fine to allow very little passage of the air.

Figure 5:
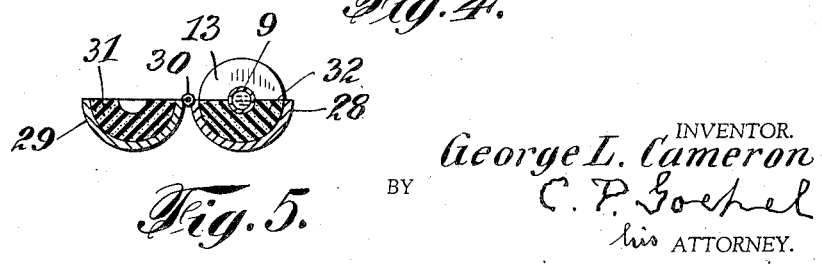
Figure 5 is a section taken on line 5—5 of Figure 4.

In Figure 5, I have shown a hinged case in which each casing cover is provided with a cut half of the sheath and cushioning members. In this form, the cover 28 is hinged to the cover 29 by the hinge 30; one-half 31 of the sheath is placed in cover 29 and one-half 32 of the sheath is placed in the cover 28. The other cover 29 is provided with like parts. When the covers close to form the container, within which the thermometer is placed in position, the like parts registering with each other act in the same manner as in the other embodiments. This hinged case embodiment is also provided with the cushioning members 13 and 19, and shows the sheath extending the length of the thermometer.

To facilitate taking the thermometer out of its seat, a small ribbon 35 fixed at one end 36 to the casing is provided. The thermometer is placed on the ribbon, and a lifting of the ribbon lifts the thermometer.

It will be seen that the various embodiments of the invention show a structure embodying air cushions at each end of the thermometer and having a sheath for the thermometer, whereby it is rubber mounted, and air cushioned and completely surrounded and thereby held, so to say, in suspension in an air cushioned rubber bed.

It will also be noted that the ends of the thermometer abut against the cushions, the body of the thermometer being held along its length by the sheath. In consequence, the thermometer is not subjected to any leverage action which would tend to break it on the falling of the casing.

It is clear that any kind of thermometer may be used instead of the one shown, as for instance, a rectal thermometer or a veterinary thermometer, or the like.

The action of the air cushioning members is such that if by reason of any projection of the thermometer against the top of the cushion the air held within the cushion will enable the thermometer to compress the cushion to some extent, and also compress the air therein, but there will not be any resistance to the thermometer, as would be the case if only rubber or the like be used.

The pen or pencil-shaped container may be provided with a catch or clip, as is well known.

My invention has been illustrated and described with some degree of particularity, but it is understood that changes may be made in the form of details and in the construction and arrangement of parts without departing from the spirit and scope of the invention or the scope of the appended claim.

I claim:

A thermometer casing comprising an outer container, a resilient cushioning liner in said container of a length to extend along the greater part of the thermometer and having a bore corresponding substantially to the shape of the thermometer adapted to exert support on the thermometer equally at all points on its perimeter, and a hollow cylindrical member having a closed yieldable top wall at each end of the container in reverse position to each other, the cylindrical member snugly engaging the interior of the container at either end thereof, and the top wall being adapted to abut against the end tips of the thermometer, whereby the space within the cylindrical member and the walls of the container form with said top wall an air enclosing chamber, said top wall and air within the chamber being resilient to any sudden thrust of the tip of the thermometer against the top wall.

GEORGE L. CAMERON.